(12) United States Patent
Raj et al.

(10) Patent No.: US 11,281,569 B2
(45) Date of Patent: Mar. 22, 2022

(54) SELF-CURATIVE COMPUTER PROCESS AUTOMATES

(71) Applicant: SAP SE, Walldorf (DE)

(72) Inventors: Ayush Raj, Patna (IN); Nitin Dileepkumar, Kerala (IN); Prakash Kumar, Bangalore (IN)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 16/251,886

(22) Filed: Jan. 18, 2019

(65) Prior Publication Data

US 2020/0233785 A1 Jul. 23, 2020

(51) Int. Cl.

| G06F 9/44 | (2018.01) |
|---|---|
| G06F 11/36 | (2006.01) |
| G06F 16/958 | (2019.01) |
| G06F 8/38 | (2018.01) |
| G06F 3/0482 | (2013.01) |
| G06F 3/04845 | (2022.01) |
| G06F 3/0483 | (2013.01) |

(52) U.S. Cl.
CPC ............ G06F 11/3688 (2013.01); G06F 8/38 (2013.01); G06F 16/958 (2019.01); *G06F 3/0482* (2013.01); *G06F 3/0483* (2013.01); *G06F 3/04845* (2013.01)

(58) Field of Classification Search
CPC .................................................. G06F 11/3688
USPC .......................................................... 717/124
See application file for complete search history.

(56) References Cited

U.S. PATENT DOCUMENTS

| 2011/0302173 A1* | 12/2011 | Schwartz | G06F 9/52 |
| | | | 707/748 |
| 2012/0311541 A1* | 12/2012 | Bullard | G06F 11/368 |
| | | | 717/127 |
| 2015/0339213 A1* | 11/2015 | Lee | G06F 3/0484 |
| | | | 717/125 |
| 2020/0073686 A1* | 3/2020 | Hanke | G06F 16/95 |

* cited by examiner

*Primary Examiner* — Timothy A Mudrick
(74) *Attorney, Agent, or Firm* — Erise IP, P.A.

(57) ABSTRACT

Systems, methods, and products, are described herein for self-curative computer process automates. Execution of an automate for testing of an application is initiated. The application includes a plurality of user interface elements, each user interface element having a plurality of properties. A change to a user interface element of the plurality of user interface elements during the execution of the automate is identified based on a change to at least one property of the plurality of properties associated with the user interface element. A modification to the plurality of properties associated with the user interface element is generated based on a ranking of the plurality of user interface elements, the generated modification curing the change to the at least one property. The generated modification is caused to display on a graphical user interface for further acceptance of the generated modification to the automate.

20 Claims, 6 Drawing Sheets

SELF-CURATIVE COMPUTER PROCESS AUTOMATES

TECHNICAL FIELD

The subject matter described herein relates to self-curative computer process automates.

BACKGROUND

Web-based user interface (UI) applications can be developed using Hypertext Markup Language (HTML). Each HTML document contain details of page layout, style and different UI elements. Each UI element includes a number of properties. UI testing automation can be used for a number of applications, including web-based applications. UI testing automation is the mimicking of a set of predefined user actions needed to achieve specific testing processes for applications. Recording functionality can be used to facilitate this mimicking. These recording functions can capture different properties from the HTML document rendered in a web browser, or it can capture the visual information with a screen capture. Once recording is complete, the set of recorded actions can be performed repeatedly in an automated way. The purpose of such a recording is to uniquely capture properties (e.g., such as those in an HTML document) of the UI element on which action is performed with these properties. The same set of user actions can be performed programmatically (e.g., in automated way) by uniquely identifying the correct UI element to operate upon. Achieving automation in early phase of the application development can require continuous adapting and maintaining the automated scripts (e.g., automates). Such adaptions can be due to continuous changing of the UI elements.

SUMMARY

In one aspect, execution of an automate for testing of an application is initiated. The application includes a plurality of user interface elements, each user interface element having a plurality of properties. A change to a user interface element of the plurality of user interface elements during the execution of the automate is identified based on a change to at least one property of the plurality of properties associated with the user interface element. A modification to the plurality of properties associated with the user interface element is generated based on a ranking of the plurality of user interface elements, the generated modification curing the change to the at least one property. The generated modification is caused to display on a graphical user interface for further acceptance of the generated modification to the automate.

In some variations, an acceptance, derived from user input via the graphical user interface, of the generated modification can be received. Execution of the automate having the generated modification can be initiated for further testing of the user interface.

In other variations, identifying the change can include iteratively assigning a rank to each user interface element of the plurality of user interface elements. A delta between two user interface elements having a highest rank and a second highest rank can be determined. Based on the delta exceeding a predetermined threshold, the user interface element having the highest rank can be identified. The generated modification can be based on the plurality of properties associated with the user interface element having the highest rank.

In some variations, whether the change is a hidden element can be determined.

In other variations, the application can be a web-based application.

In some variations, the application can be an Hypertext Markup Language (HTML)-based application.

In other variations, the plurality of properties can include at least one of: an aggregation, an association, a parent hierarchy, a binding context, an event registry, an element metadata class, or an element identification.

In some variations, the change can be a layout change of some of the plurality of user interface elements.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides an adaptive self curative testing interface which automatically detects differences in testing applications and adjusts accordingly. Such self-curative automates can obviate a need for re-recording an automate after UI element changes are made in a different application version.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Automated test scripts or automates can be used to perform testing on an application, such as a web-based application, without the need of a user executing each and every step of the test manually. Automates can perform a series of predetermined testing steps, which can rely upon UI elements and associated properties within those UI elements. When an application is modified, however, execution of an automated test recorded based on a different application version can cause the automate to look for one or more properties that have since changed. As a result, execution of the automate may fail due to lack of the one or more properties. Self-curative automates, such as those described herein, can remedy this failure without the need to rerecord the automate. Instead, the self-curative automate can identify a change in one or more properties of a UI element (e.g., changes to a layout of a UI) and generate a proposed modification to cure those changed properties, using the current subject matter.

Figure 1:
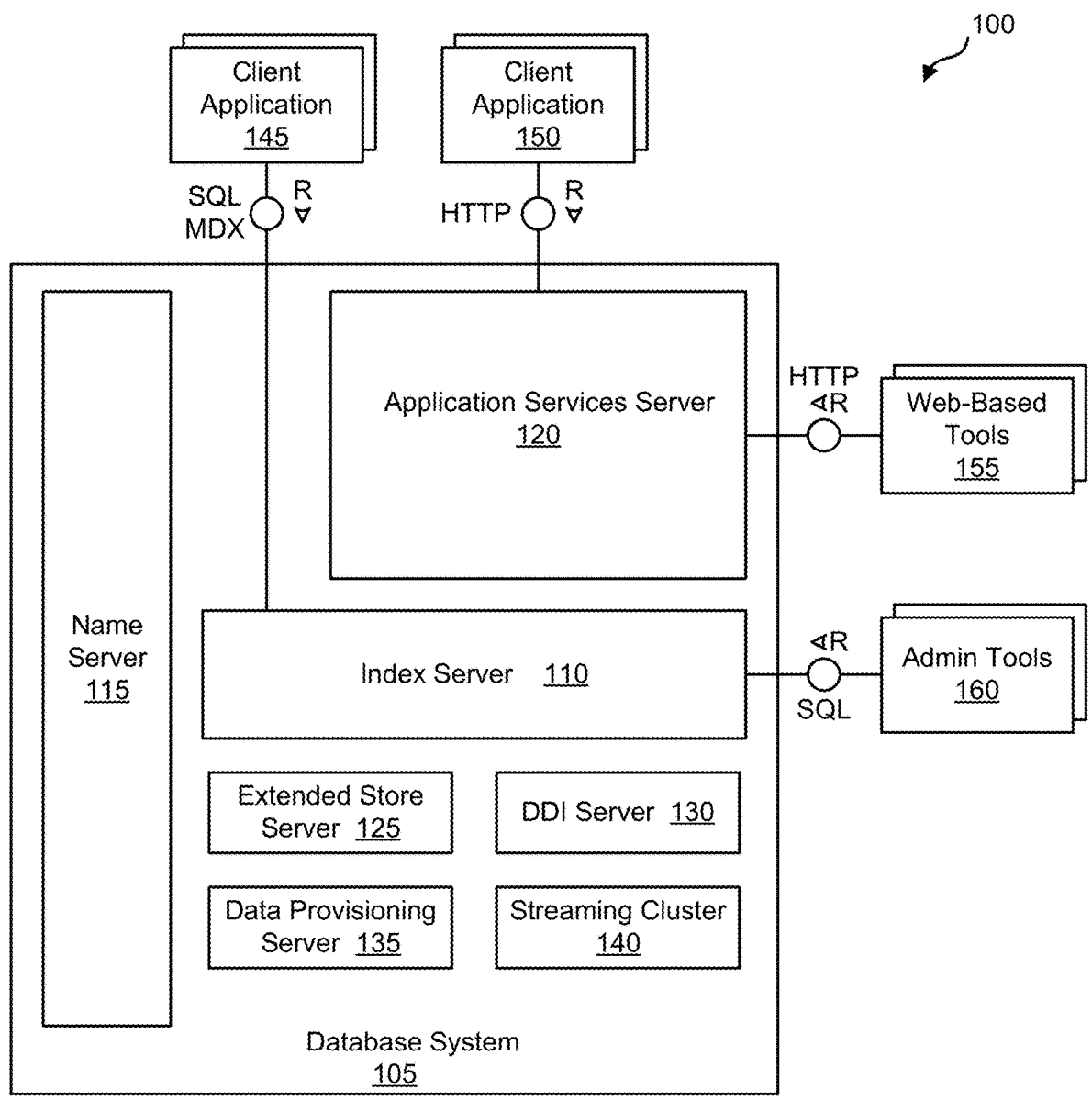
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk input output (I/O) and in which disk storage is required to make any changes durable. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management, and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter software development kit (SDK) for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
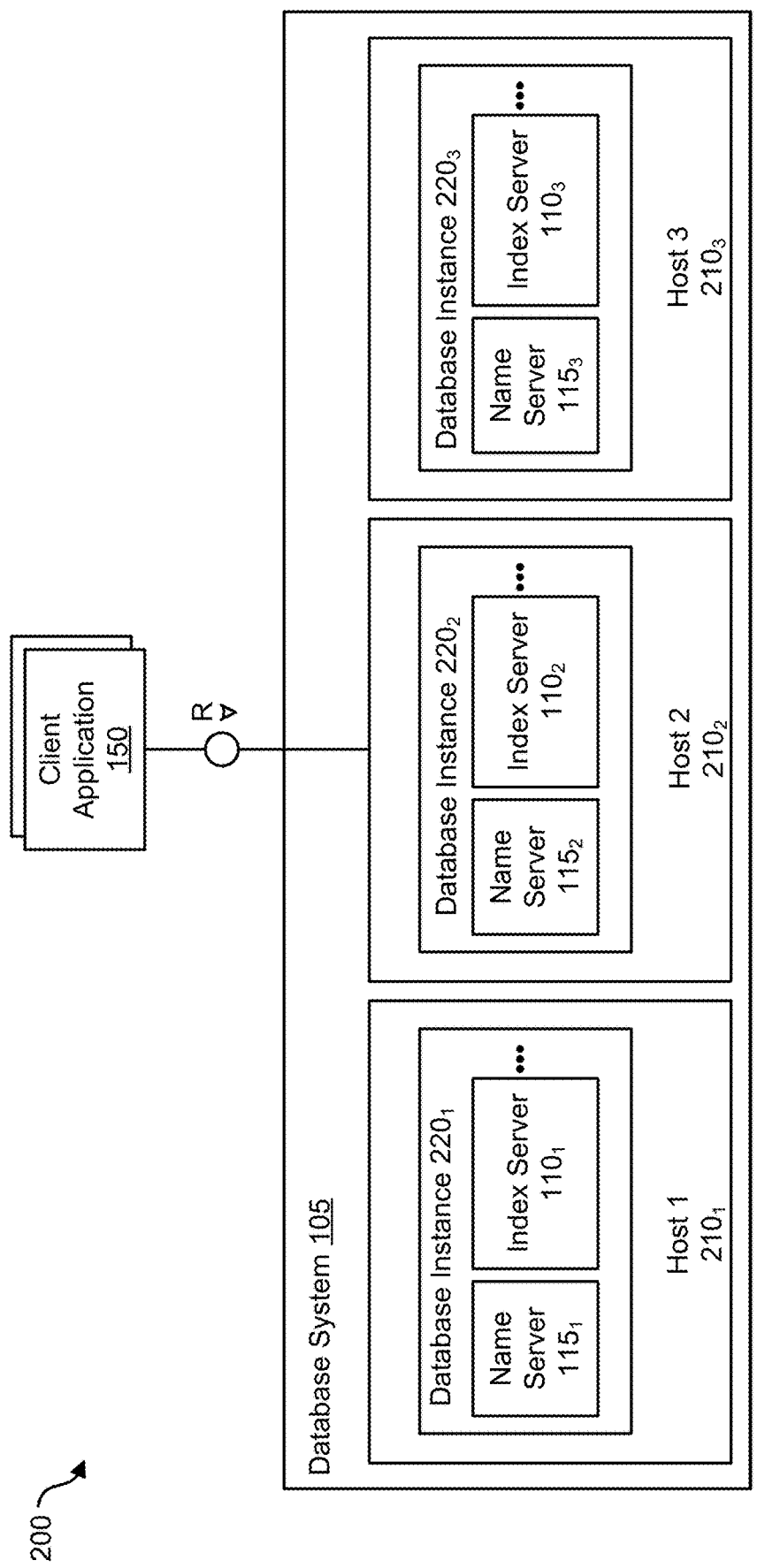
FIG. 2 is a system diagram illustrating an example database system that can support distribution of server components across multiple hosts for scalability and/or availability purposes for use in connection with the current subject matter.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 150 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
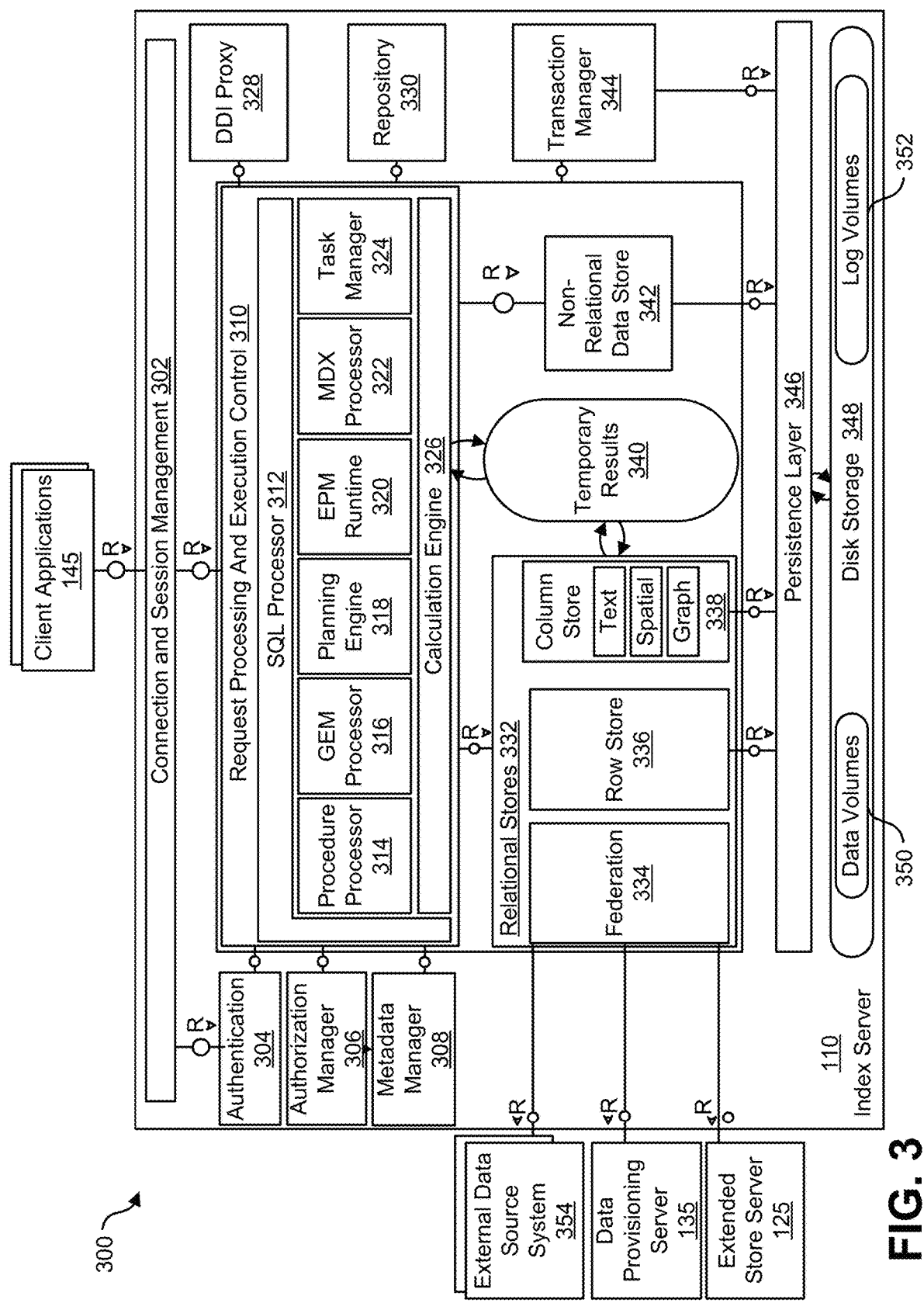
FIG. 3 is a diagram illustrating an architecture for an index server for use in connection with the current subject matter.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 105 to check whether the user has the required privileges to execute the requested operations.

Each statement can be processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework). Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 306. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 306 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead, it is built using the column store 338, which can have a dedicated graph Application Program Interface (API).

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extend transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and save points. The persistence layer 346 can provide interfaces for writing and reading persisted data and it can also contain a logger component that manages a transaction log. Recovery log entries can be written in the persistence layer 346 (in recovery log volumes 352) explicitly by using log interface or implicitly when using the virtual file abstracting. The recovery log volumes 352 can include redo logs which specify database operations to be replayed whereas data volume 350 contains undo logs which specify database operations to be undone as well as cleanup logs of committed operations which can be executed by a garbage collection process to reorganize the data area (e.g., free up space occupied by deleted data etc.).

The persistence layer 346 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4A:
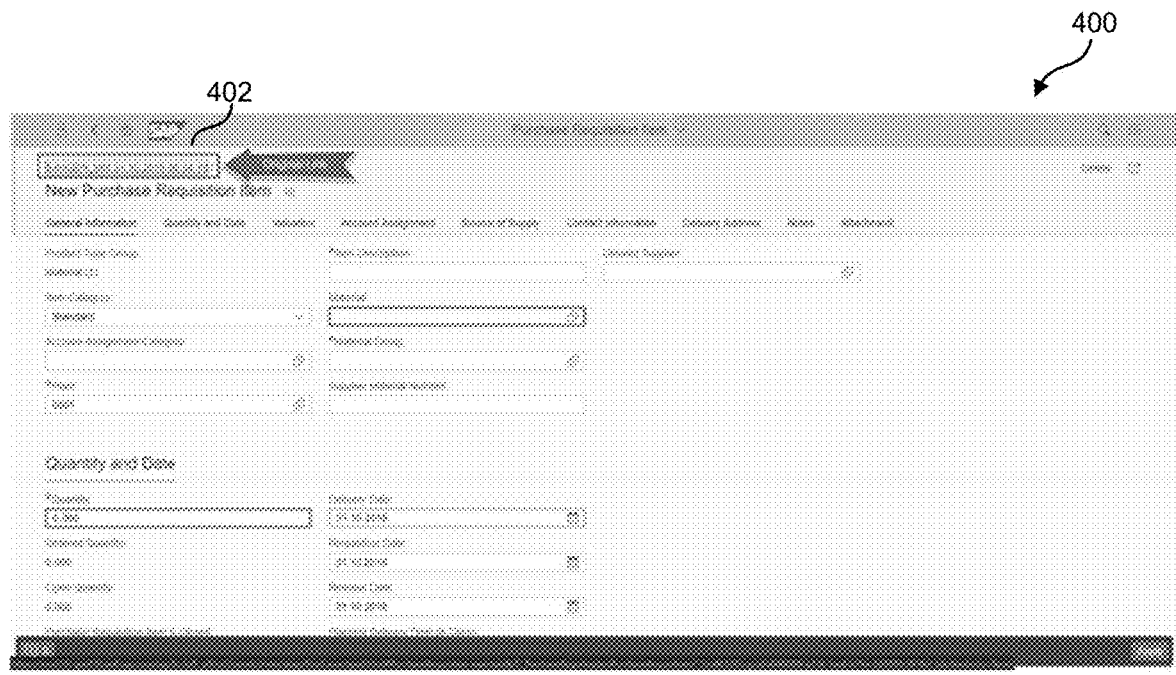
FIG. 4A is a screenshot illustrating an example application.
Figure 4B:
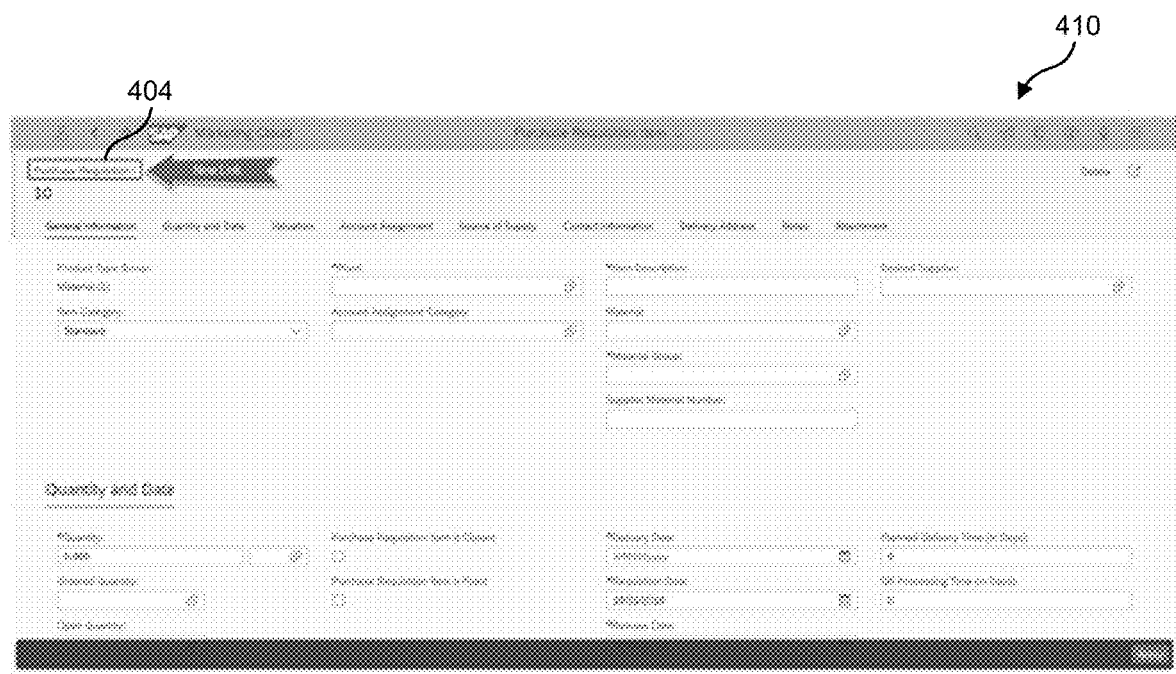
FIG. 4B illustrates a screenshot having a changed UI element in a software version different than that illustrated in FIG. 4B.

FIG. 4A is a screenshot 400 illustrating a graphical user interface of an example application of a software version. In this example, an automate was recorded using an application developed for a first software version. Execution of the automate results in clicking on a UI element 402. UI element 402 includes properties of "user id" and "timestamp." FIG. 4B illustrates a screenshot 410 having a changed UI element 404 in a software version different than that illustrated in FIG. 4B. As illustrated in FIG. 4B, UI element 402 was changed from an element having label properties of "user id" and "timestamp" to UI element 404 having a label property of "purchase request." Because the label properties of UI element 402, in this example, changed between the version of screenshot 400 and the version in screenshot 410, the automate recorded for the first software version may no longer function properly unless the automate is self cured.

Figure 5:
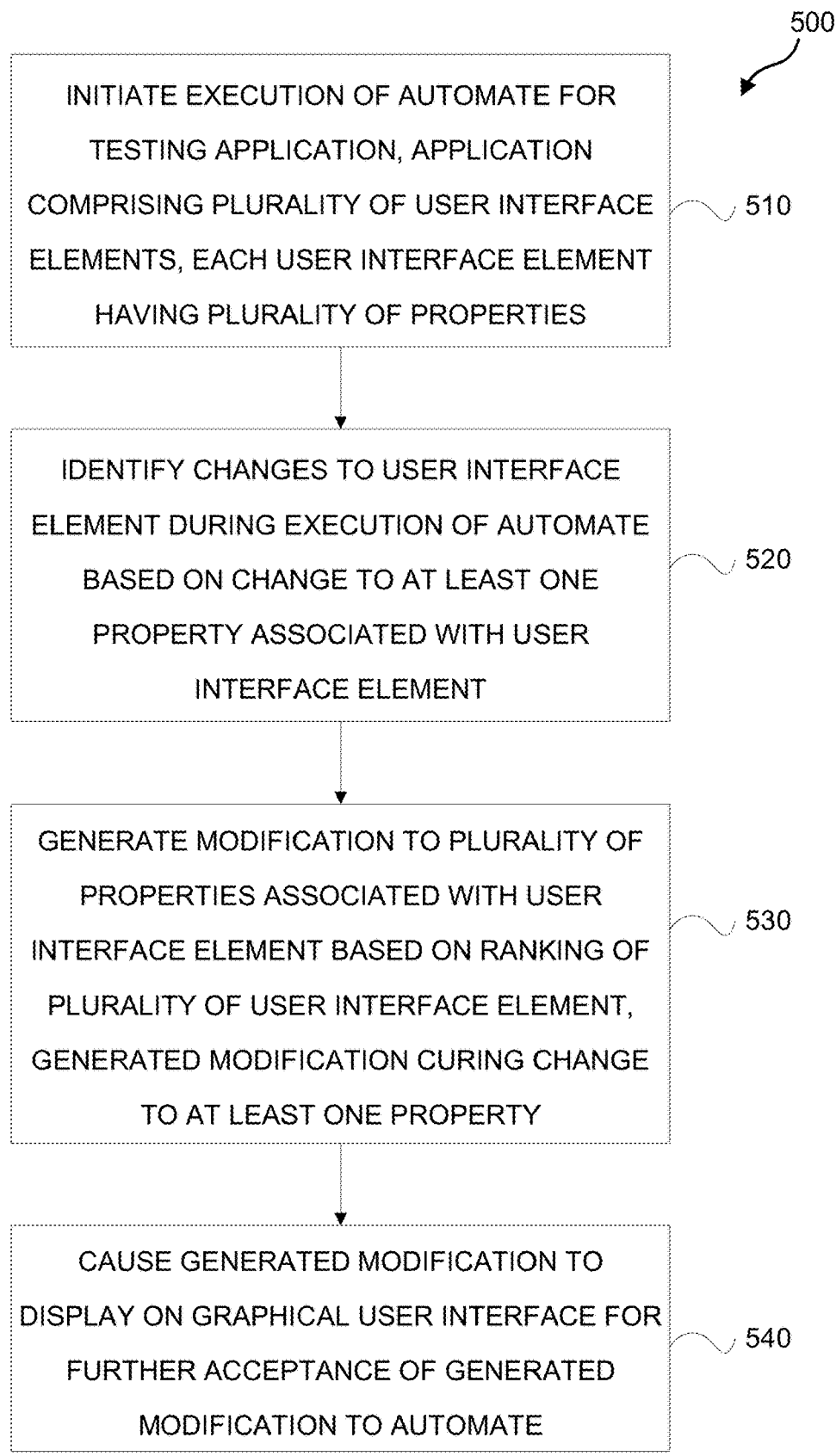
FIG. 5 illustrates a process flow diagram for a self-curative automate method.

FIG. 5 illustrates a process flow diagram 500 for a self-curative automate method. In order to self-cure the automate such that the change in UI element 402 to UI element 404 can be properly handled by the automate, a self-curative method can be employed. Each UI element (e.g., UI element 402, 404) can include a plurality of properties such as a label which specifies a user-readable title of the text, an identification which is a unique attribute that identifies the UI element, a type which defines the type of UI element (e.g., button, input, command, embed, object, script, source, style, menu, etc.), a positional property (e.g., near by, style left, style right), and/or a relational property (e.g., parent UI element, child UI element). Additional UI element properties can relate to aggregations, associations, binding context, event registry, and/or element metadata class.

Execution of the automate for testing an application can be initiated, at 510. The application can include a plurality of UI elements each having a plurality of properties. During execution of an automate, if the automate is unable to locate a UI element with available properties, it indicates that there is a change in application (e.g., HTML document). In other words, a change to the UI can be identified, at 520, during execution of the automate based on a change to at least one property of the UI element. The indication of the change denotes that the automate requires a modification before it can successfully complete its testing. A change can be either a functional flow change or a layout change. If the change is functional flow change, a new recording may be required. If change is related to a layout adjustment (e.g., change in location of UI elements within the application), is related to replacement of a UI element, or any other changes related to the UI elements in particular, the self-curative software can be injected into the browser during execution of the automate.

A modification to the UI element properties can be generated, at 530, based on a ranking of the UI elements of the application. For example, the self-curative software can generate a list the various UI elements belonging to the application. The listing can then be assigned a rank based on suitability (e.g., overlapping matching properties with a previous UI Element). Based on the ranking of the UI elements of the application, a machine learning-based trained module can further narrow down the list of UI element and generate a probability of success for self-curation of script with the new UI element (e.g., identified properties to replace the changed properties of the changed UI element). The self-curative software can also be executed during execution of automation to detect potential needed changes. A user can be provided a report containing details of needed changes, or the self-curative software can automatically cure the automate based on the identified changes.

At any point during execution of the automate, if any recorded step fails as a result of failing to match properties of the UI element from a previous version of the application (e.g., original UI element) with the UI element of the current application (e.g., current UI element), ranking logic can be executed which can identify the change and propose a modification to properties of the changed UI element. Properties related to the application framework can be extracted from the automate and stored in memory. Based on the non-extracted properties of the original UI element, similar UI elements are collected to be considered for auto adaption. If there are no similar UI elements that can be determined, all actionable UI elements in the application are considered. After the collection of the UI elements and their associated properties, the UI elements are iteratively considered (e.g., one by one) for ranking. Predefined ranks of the properties can be assigned based on backtracking through incremental and decremental values to correspond to the similar UI elements. Supervised machine learning can rank the properties and update the training data based on training data sets collected during recording. After the UI elements are each assigned a rank, the delta between the ranks of the highest and second highest UI elements can be determined. Determining the delta can be performed by taking a difference between the highest ranked UI element and the second highest ranked UI element. This delta can be compared to a predetermined threshold value. If the delta is higher than the predetermined threshold value, then the properties associated with the highest ranked UI element can be proposed as a modification to the original UI element. The delta calculation can be used in order to eliminate false positives. Additionally, false positives can be eliminated by checking whether the highest ranked element is a hidden element.

If the UI element identification is returned from the ranking logic, the automate step is executed with this UI element and the new properties for that UI element can be recorded. After the proposed modification is made, the user can be given a choice to approve or reject the modification. This can occur, for example, by providing a user with the generated modification via a graphical user interface, such as described in more detail in FIG. 6. In other words, the generated modification can be caused, at 540, to display on a graphical user interface for further acceptance (e.g., accept or reject) of the generated modification. A user can interact with the graphical user interface using any of the various inputs described in FIG. 6, to provide either an approval of the generated modification or a rejection of the modification. Based on an approval of the modification, the properties of the highest ranked UI element can be written to replace the original UI element properties.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random access memory associated with one or more physical processor cores.

Figure 6:
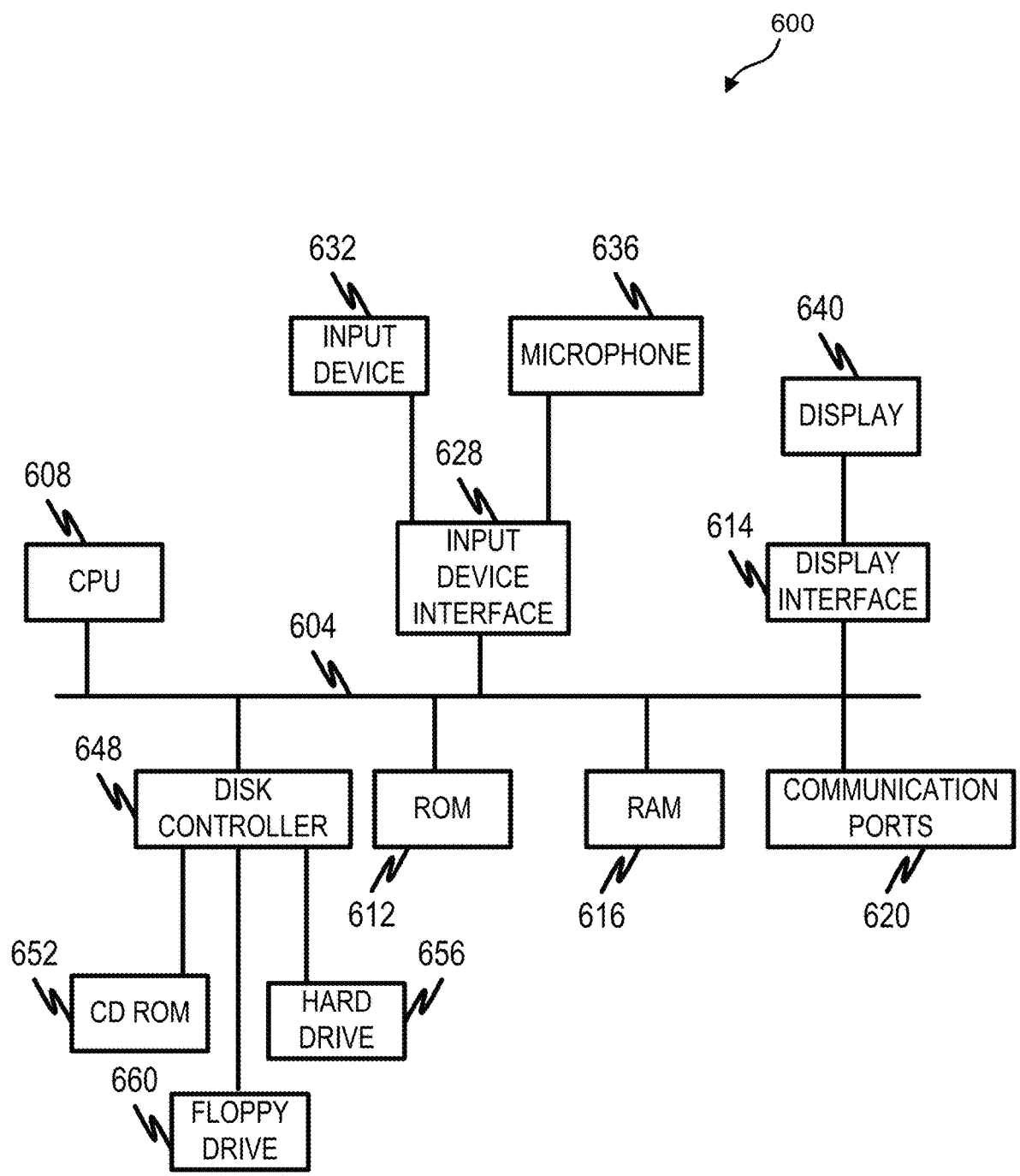
FIG. 6 is a diagram illustrating a sample computing device architecture for implementing various aspects described herein.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 908 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method implemented by one or more data processors forming part of at least one computing device, the method comprising:
   initiating execution of an automate for testing of an application, the application comprising a plurality of user interface elements, each user interface element having a plurality of properties;
   identifying a change to a user interface element of the plurality of user interface elements during the execution of the automate based on a change to at least one property of the plurality of properties associated with the user interface element;
   iteratively, during execution of the automate, assigning a ranking to each user interface element of the plurality of user interface elements using a ranking logic;
   generating a modification to the plurality of properties associated with the user interface element based on the ranking of the plurality of user interface elements, the generated modification curing the change to the at least one property;
   determining, using a trained machine learning module, a probability of success associated with curing the change using the generated modification based on the ranking of the plurality of user interface elements; and
   causing, based on the probability of success, the generated modification to display on a graphical user interface for further acceptance of the generated modification to the automate.

2. The method of claim 1, further comprising:
   receiving an acceptance, derived from user input via the graphical user interface, of the generated modification; and
   initiating execution of the automate having the generated modification for further testing of the user interface.

3. The method of claim 1, wherein identifying the change comprises:
   determining a delta between two user interface elements having a highest rank and a second highest rank; and
   identifying, based on the delta exceeding a predetermined threshold, the user interface element having the highest rank.

4. The method of claim 3, wherein the generated modification is based on the plurality of properties associated with the user interface element having the highest rank.

5. The method of claim 1, further comprising determining whether the change is a hidden element.

6. The method of claim 1, wherein the application is a web-based application.

7. The method of claim 1, wherein the application is an Hypertext Markup Language (HTML)-based application.

8. The method of claim 1, wherein the plurality of properties include at least one of: an aggregation, an association, a parent hierarchy, a binding context, an event registry, an element metadata class, or an element identification.

9. The method of claim 1, wherein the change is a layout change of some of the plurality of user interface elements.

10. A system comprising:
at least one data processor; and
memory storing instructions, which when executed by the at least one data processor, result in operations comprising:
   initiating execution of an automate for testing of an application, the application comprising a plurality of user interface elements, each user interface element having a plurality of properties;
   identifying a change to a user interface element of the plurality of user interface elements during the execution of the automate based on a change to at least one property of the plurality of properties associated with the user interface element;
   iteratively, during execution of the automate, assigning a ranking to each user interface element of the plurality of user interface elements using a ranking logic;
   generating a modification to the plurality of properties associated with the user interface element based on the ranking of the plurality of user interface elements, the generated modification curing the change to the at least one property;
   determining, using a trained machine learning module, a probability of success associated with curing the change using the generated modification based on the ranking of the plurality of user interface elements; and
   causing, based on the probability of success, the generated modification to display on a graphical user interface for further acceptance of the generated modification to the automate.

11. The system of claim 10, wherein the operations further comprise:
   receiving an acceptance, derived from user input via the graphical user interface, of the generated modification; and
   initiating execution of the automate having the generated modification for further testing of the user interface.

12. The system of claim 10, wherein identifying the change comprises:
   determining a delta between two user interface elements having a highest rank and a second highest rank; and
   identifying, based on the delta exceeding a predetermined threshold, the user interface element having the highest rank.

13. The system of claim 12, wherein the generated modification is based on the plurality of properties associated with the user interface element having the highest rank.

14. The system of claim 10, wherein the operations further comprise determining
   whether the change is a hidden element.

15. The system of claim 10, wherein the application is a web-based application.

16. The system of claim 10, wherein the application is a Hypertext Markup Language (HTML)-based application.

17. The system of claim 10, wherein the plurality of properties include at least one of:
   an aggregation, an association, a parent hierarchy, a binding context, an event registry, an element metadata class, or an element identification.

18. The system of claim 10, wherein the change is a layout change of some of the plurality of user interface elements.

19. The system of claim 10, further comprising an in-memory database storing the memory storing instructions.

20. A non-transitory computer program product storing instructions, which when executed by at least one data processor forming part of at least one computing device, results in operations comprising:
   initiating execution of an automate for testing of an application, the application comprising a plurality of user interface elements, each user interface element having a plurality of properties;
   identifying a change to a user interface element of the plurality of user interface elements during the execution of the automate based on a change to at least one property of the plurality of properties associated with the user interface element;
   iteratively, during execution of the automate, assigning a ranking to each user interface element of the plurality of user interface elements using a ranking logic;
   generating a modification to the plurality of properties associated with the user interface element based on the ranking of the plurality of user interface elements, the generated modification curing the change to the at least one property;
   determining, using a trained machine learning module, a probability of success associated with curing the change using the generated modification based on the ranking of the plurality of user interface elements; and
   causing, based on the probability of success, the generated modification to display on a graphical user interface for further acceptance of the generated modification to the automate.

* * * * *